(12) United States Patent
Zhou (10) Patent No.: US 11,638,271 B2
(45) Date of Patent: Apr. 25, 2023

(54) METHOD FOR INFORMATION TRANSMISSION ADJUSTMENT, BASE STATION, AND USER EQUIPMENT

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 413 days.

(21) Appl. No.: 16/781,452

(22) Filed: Feb. 4, 2020

(65) Prior Publication Data
US 2020/0178264 A1 Jun. 4, 2020

Related U.S. Application Data

(63) Continuation of application No. PCT/CN2017/096903, filed on Aug. 10, 2017.

(51) Int. Cl.
H04W 72/12 (2023.01)
H04W 72/20 (2023.01)

(52) U.S. Cl.
CPC .......... *H04W 72/12* (2013.01); *H04W 72/20* (2023.01)

(58) Field of Classification Search
CPC .......................... H04W 72/12; H04W 72/0406
See application file for complete search history.

(56) References Cited

U.S. PATENT DOCUMENTS

| 2015/0282139 A1 | 10/2015 | Sun et al. | |
| 2020/0092888 A1* | 3/2020 | Zhang | H04W 72/042 |
| 2022/0070970 A1* | 3/2022 | Zhou | H04W 72/0453 |

FOREIGN PATENT DOCUMENTS

| CN | 101626603 A | | 1/2010 | |
| CN | 103327630 A | * | 9/2013 | ........ H04W 72/1278 |
| CN | 103580833 A | | 2/2014 | |
| WO | WO 2014/046577 A1 | | 3/2014 | |

OTHER PUBLICATIONS

NTT DOCOMO et al: "RAN WG's progress on NR WI in the May meeting 2017", 3GPP TSG-RAN WG2 NR Ad-hoc, R2-1706443, Qingdao, China, Jun. 27-29, 2017, 45 pages.

Interdigital et al: "Bandwidth Adaptation via BWP Selection in NR", 3GPP TSG RAN WG1 NR Ad-Hoc #2, R1-1710878, Qingdao, China, Jun. 27-30, 2017, 3 pages.

(Continued)

*Primary Examiner* — Rhonda L Murphy
(74) *Attorney, Agent, or Firm* — Finnegan, Henderson, Farabow, Garrett & Dunner, L.L.P.

(57) ABSTRACT

A method for adjusting information transmission, includes: determining information of periodic-scheduling configuration of target user equipment (UE), the information of periodic-scheduling configuration being configured to instruct the target UE to transmit service data periodically through at least two different band width parts (BWPs); sending the information of periodic-scheduling configuration to the target UE to enable the target UE to make periodic-transmission configuration; and periodically scheduling, according to the information of periodic-scheduling configuration, the target UE on different BWPs for information transmission.

12 Claims, 8 Drawing Sheets

(56) References Cited

OTHER PUBLICATIONS

Supplementary European Search Report in European Application No. 17920915.0, dated Dec. 18, 2020.
International Search Report in the International Application No. PCT/CN2017/096903, dated Apr. 28, 2018.
English Translation of the Written Opinion of the International Search Authority in the International Application No. PCT/CN2017/096903, dated Apr. 28, 2018.
Huawei, HiSilicon, *On bandwidth adaptation*, 3GPP TSG RAN WG1 NR Ad-Hoc Meeting, R1-1711424, Qingdao, China, Jun. 27-30, 2017, 5 pgs.

* cited by examiner

METHOD FOR INFORMATION TRANSMISSION ADJUSTMENT, BASE STATION, AND USER EQUIPMENT

CROSS-REFERENCE TO RELATED APPLICATION

This application is a continuation of and claims priority to International Application No. PCT/CN2017/096903 filed on Aug. 10, 2017, the content of which is hereby incorporated by reference in its entirety.

TECHNICAL FIELD

The present disclosure relates to the technical field of communication, and more particularly, to a method for adjusting information transmission, a base station, and user equipment (UE).

BACKGROUND 5G new radio (NR) may be deployed within a range of high frequencies from 3.3 GHz to 24 GHz, therefore, the frequency range of each carrier in a 5G NR system may be larger than the frequency range of each carrier in a 4G long term evolution (LTE) system. In a 5G network, the bandwidth of a single band is close to 1 GHz, and the bandwidth of a single carrier is between 80 MHz and 400 MHz. A single carrier may be divided into multiple band width parts (BWPs) for saving energy of UE in the 5G network. A base station may schedule UEs on one or more BWPs.

For some UEs such as Internet of Things (IoT) devices, transmission traffic in different time ranges may be different. If a base station schedules UE on a fixed bandwidth BWP, the bandwidth of the BWP may be used mainly for meeting the requirement of the UE to transmit broadband services, in such a case, resource waste can be caused within a time range during which a narrow-band service namely a low-data volume service is transmitted. On the contrary, if the bandwidth of the BWP is small, the transmission delay of the broadband service may be increased, which may degrade the user experience in use of a 5G network device.

SUMMARY

Embodiments of the present disclosure provide a method for adjusting information transmission, a base station, and UE, which may avoid transmission loss in a BWP handover.

According to a first aspect of the embodiments of the present disclosure, a method for adjusting information transmission, applied to a base station, includes: determining information of periodic-scheduling configuration of target user equipment (UE), the information of periodic-scheduling configuration being configured to instruct the target UE to transmit service data periodically through at least two different band width parts (BWPs); sending the information of periodic-scheduling configuration to the target UE to enable the target UE to make periodic-transmission configuration; and periodically scheduling, according to the information of periodic-scheduling configuration, the target UE on different BWPs for information transmission.

According to a second aspect of the embodiments of the present disclosure, a method for adjusting information transmission, applied to UE, includes: receiving information of periodic-scheduling configuration from a base station, the information of periodic-scheduling configuration being configured to instruct the UE to transmit different service data periodically through at least two band width parts (BWPs); making periodic-transmission configuration according to the information of periodic-scheduling configuration; and transmitting information by using different BWP time-frequency resources scheduled periodically by the base station.

According to a third aspect of the embodiments of the present disclosure, a base station includes: a processor; and a memory configured to store an executable instruction of the processor, wherein the processor is configured to: determine information of periodic-scheduling configuration of target UE, the information of periodic-scheduling configuration being configured to instruct the target UE to transmit service data periodically through at least two different BWPs; send the information of periodic-scheduling configuration to the target UE to enable the target UE to make periodic-transmission configuration; and periodically schedule according to the information of periodic-scheduling configuration, the target UE on different BWPs for information transmission.

According to a fourth aspect of the embodiments of the present disclosure, UE includes: a processor: and a memory configured to store an executable instruction of the processor, wherein the processor is configured to: receive information of periodic-scheduling configuration from a base station, the information of periodic-scheduling configuration being used for instructing the UE to transmit different service data periodically through at least two BWPs; make periodic-transmission configuration according to the information of periodic-scheduling configuration; and transmit information by using different BWP time-frequency resources scheduled periodically by the base station.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The methods provided in the present disclosure may be performed by a base station, a sub-base station, or the like, provided with a large-scale antenna array, which are collectively referred to as a base station, or User Equipment (UE). The UE may be a user terminal, a user node, a mobile terminal, or a tablet. In some embodiments, the base station and the UE are independent of each other and meanwhile are in contact with each other to perform the methods.

In an application scenario of the present disclosure, the transmission traffic volume of target UE in different time periods may change in a preset time period, such as one day or one month.

Based on this, in order to utilize wireless transmission resources reasonably, the present disclosure provides a method for adjusting information transmission, which is suitable for adjusting a scheduling mode to a periodic scheduling mode in the process of transmitting information by the target UE, or for determining a scheduling mode of the target UE as a periodic scheduling mode when the target UE accesses a network, and for achieving free handover between periodic scheduling and aperiodic scheduling according to the actual service requirement of the target UE.

Figure 1:
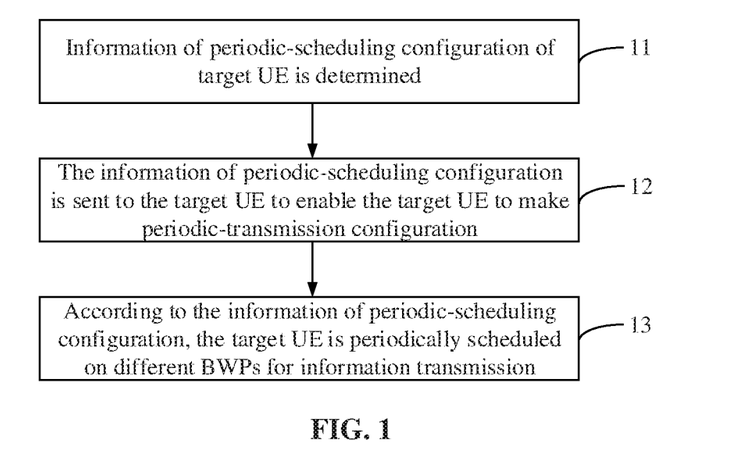
FIG. 1 is a flowchart illustrating a method for adjusting information transmission according to an exemplary embodiment.

FIG. 1 is a flowchart illustrating a method for adjusting information transmission according to an exemplary embodiment. The method is applied to a base station, and may include the following steps.

In step 11, information of periodic-scheduling configuration of target UE is determined, the information of periodic-scheduling configuration being configured to instruct the target UE to transmit service data periodically through at least two different BWPs.

In the embodiment of the present disclosure, the information of periodic-scheduling configuration may include: a preset cycle length T, at least two time windows arranged in a preset order within the cycle length T, and information of transmission configuration of a BWP corresponding to each time window. The information of transmission configuration of the BWP may include: a frequency range, and a time-frequency position of a Control Resource Set (CORESET). The number of the time windows is greater than or equal to 2; and the frequency ranges of at least two adjacent BWPs are different.

Accordingly, the information of periodic-scheduling configuration may include: a preset cycle length T, at least two BWP transmission windows arranged in a preset order, and information of transmission configuration of each BWP transmission window. The information of transmission configuration of each BWP transmission window may include: a transmission duration, a frequency range, and a time-frequency position of a CORESET. Downlink control information (DCI) of the target UE may be carried in the CORESET of each BWP. The DCI of the target UE may include: scheduling control information of the target UE, reference signal configuration, and the like.

In another embodiment of the present disclosure, in a case that at least two BWPs configured in a scheduling period determined by the base station include currently scheduled BWP0, the information of periodic-scheduling configuration may not include part of information of transmission configuration of BWP0, such as a range of working frequencies and a time-frequency position of the CORESET, thereby reducing the data volume of configuration information, and saving signaling overheads.

In the present disclosure, regarding the timing at which the base station is triggered to determine the information of periodic-scheduling configuration, there may be two situations as follows.

In the first situation, the base station determines the information of periodic-scheduling configuration initiatively under a preset trigger condition.

For example, upon when detecting that the target UE accesses a network, the base station may initiatively determine the information of periodic-scheduling configuration of the target UE according to equipment information of the UE, such as an identity and a device type.

In the second situation, after a periodic scheduling request is received from the target UE, the information of periodic-scheduling configuration is determined passively in response to the periodic scheduling request.

Figure 2:
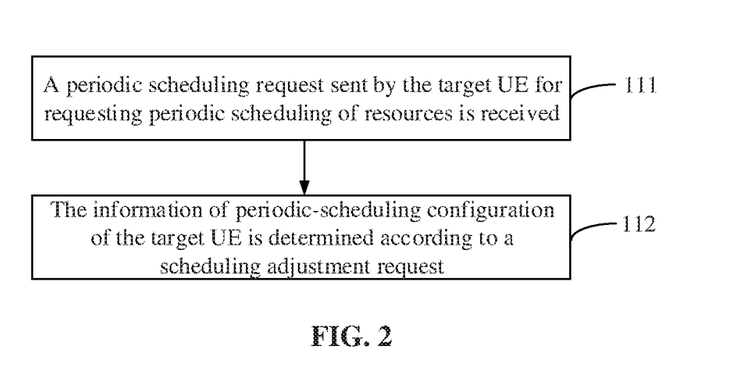
FIG. 2 is a flowchart illustrating a method for adjusting information transmission according to an exemplary embodiment.

For the second situation, FIG. 2 is a flowchart illustrating the step 11 of the method for adjusting information transmission according to an exemplary embodiment. In this embodiment, the step 11 may include the following operations.

In step 111, a periodic scheduling request sent by the target UE for requesting periodic scheduling of resources is received, the periodic scheduling request at least including: an identity of the target UE and information of the periodic scheduling request. The information of the periodic scheduling request includes information that is sent by the target UE to request the base station to start periodic scheduling for the target UE and also information about how to periodically schedule transmission resources.

In the present disclosure, the information of the periodic scheduling request may be expressed in at least three forms according to different contents.

In the first form of expression, the information of the periodic scheduling request may be switch information for instructing to open a periodic scheduling mode, which for example, may be a 1-bit value representing activation of the periodic scheduling mode, such as 1.

In the second form of expression, the information of the periodic scheduling request may include: a cycle length, the number of and an arrangement order of time windows within the cycle length, and a time-frequency range of a BWP corresponding to each time window.

In the third form of expression, the information of the periodic scheduling request may include: window numbers of preset BWP time-frequency resource windows and ranking information of the window numbers.

The base station may preset a certain number of BWP time-frequency resource windows according to a protocol. For example, there are 8 different BWP time-frequency resource windows, each BWP time-frequency resource window has a fixed window number, and each BWP time-frequency resource window has a preset frequency range and window duration. Each UE that accesses the network can also know information about the above BWP time-frequency resource windows in advance. Exemplarily, table 1 below may be used to indicate a correspondence between BWP time-frequency resources and window numbers:

TABLE 1

| BWP time-frequency resources | Window numbers |
| --- | --- |
| BWP1 | 1 |
| BWP2 | 2 |
| ... | ... |
| BWP8 | 8 |

Exemplarily, the above information of the periodic scheduling request may include window numbers: 1, 2, and 8. It means that the target UE expects to include three BWP time-frequency resource windows in a scheduling period configured by the base station for the target UE, which are: BWP1, BWP2, and BWP8, and the above three sub-windows are arranged in a period according to a preset time sequence such as a sequential order, that is, BWP1, BWP2 and BWP8 are scheduled sequentially in the above period.

In step 112, the information of periodic-scheduling configuration of the target UE is determined according to a scheduling adjustment request.

In the embodiment of the present disclosure, the base station may determine the above information of periodic-scheduling configuration according to different contents of the received periodic scheduling request in any of the following manners:

Manner 1: Corresponding to the first form of expression, the base station determines the corresponding information of periodic-scheduling configuration according to the switch information and the identity of the target UE.

Manner 2: Corresponding to the second form of expression, if the base station determines the information of periodic-scheduling configuration based on the request of the target UE, information of periodic-scheduling configuration that meets expectations may be configured for the target UE according to a cycle length requested to be configured by the target UE, the number of and an arrangement order of time windows within the cycle length, and a BWP time-frequency resource range corresponding to each time window.

Manner 3: Corresponding to the third form of expression, similarly, if the base station determines the information of periodic-scheduling configuration based on the request of the target UE, information of periodic-scheduling configuration that meets expectations may be configured for the target UE according to window numbers of preset BWP time-frequency resource windows and ranking information of the window numbers, requested to be configured by the target UE.

Regarding determining the information of periodic-scheduling configuration according to the Manner 1, or determining the information of periodic-scheduling configuration by the base station according to the identity of the target UE in the first situation, any of the following manners can be included.

In the first manner, a preset configuration information list is queried according to the equipment information of the target UE to determine the information of periodic-scheduling configuration corresponding to the target UE.

In an embodiment, it may be assumed that a preset configuration information list is stored in the base station, and the preset configuration information list includes a correspondence between an identity of UE and information of periodic-scheduling configuration. Exemplarily, as shown in Table 2:

TABLE 2

| Identity of UE | Configuration information |
| --- | --- |
| UE1 | First periodic configuration information |
| UE2 | Second periodic configuration information |
| ... | ... |
| UEn | $N^{th}$ periodic configuration information |

Assuming that the identity of the target UE is UE1, it can be known from Table 2 that the information of periodic-scheduling configuration corresponding to UE1 is first periodic configuration information.

In another embodiment of the present disclosure, the base station may be pre-configured with different information of periodic-scheduling configuration corresponding to different device types. The base station may determine a device type of the target UE, such as a certain type of IoT device, according to the identity of the target device, and then determine information of periodic-scheduling configuration according to the device type of the target UE.

In the second manner, appropriate information of periodic-scheduling configuration may be determined according to the historical service transmission of the target UE.

Figure 3:
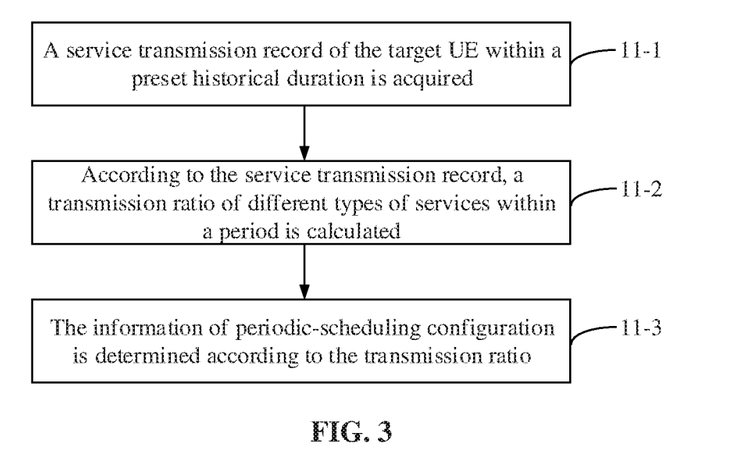
FIG. 3 is a flowchart illustrating a method for adjusting information transmission according to an exemplary embodiment.

FIG. 3 is a flowchart illustrating the step 11 of the method for adjusting information transmission according to an exemplary embodiment. In this embodiment, the step S1 may include the following operations.

In step 11-1, a service transmission record of the target UE within a preset historical duration is acquired.

If a historical service data transmission record of the target UE is stored in the base station, the base station may acquire a service transmission record of a preset historical duration. For example, the target UE may act as UE1, and the base station may acquire the service transmission record of UE1 recorded in the previous three months.

In step 11-2, according to the service transmission record, a transmission ratio of different types of services within a period is calculated.

In the embodiment, the base station may calculate the transmission ratio of the target device to transmit each service data within a period of time, such as one week or every day, according to the service transmission records in the three months. It may be assumed that the statistical result is: a ratio of an average traffic W1 transmitted by UE1 per unit time within a first period t1 such as 0:00-6:00 one day to an average traffic W2 transmitted per unit time within left time, namely a second period t2 such as 6:00-24:00, is 1:3.

In step 11-3, the information of periodic-scheduling configuration is determined according to the transmission ratio.

Correspondingly, the base station may determine the information of periodic-scheduling configuration according to the ratio of W1 to W2. The information of periodic-scheduling configuration may include a cycle length: 1 day. BWP1 may be scheduled in a first period t1; BWP2 may be scheduled in a second period t2; a bandwidth ratio of BWP1 to BWP2 is 1:3.

In the embodiment of the present disclosure, in a case that the base station is not pre-configured with the information of periodic-scheduling configuration of the target UE, the historical service data transmission record of the target UE may be used to calculate the change rule of service transmission in the time period, so as to determine the information of periodic-scheduling configuration according to the change rule of service transmission in the time period, thereby improving the intelligence of the base station.

Referring back to FIG. 1, in step 12, the information of periodic-scheduling configuration is sent to the target UE to enable the target UE to make periodic-transmission configuration.

The base station may send the above information of periodic-scheduling configuration to the target UE to instruct the target UE to configure transmission parameters in different time windows, such as adjusting a range of working frequencies, so that the target UE can acquire its own DCI and transmission resources from different BWP time-frequency resources periodically scheduled by the base station.

In an embodiment of the present disclosure, if the base station is currently scheduling the target UE on BWP0, the base station may send the information of periodic-scheduling configuration to the target UE through BWP0.

In the present disclosure, the base station may send the information of periodic-scheduling configuration to the target UE through broadcast signaling, upper layer signaling, or physical downlink control channel (PDCCH) signaling of a physical layer. The upper layer signaling may be radio resource control (RRC) signaling or a medium access control (MAC) control element (CE).

In step 13, according to the information of periodic-scheduling configuration, the target UE is periodically scheduled on different BWPs for information transmission.

The base station may periodically schedule the target UE on the BWPs corresponding to different time windows according to the above cycle length T, specifically including: periodically configuring CORESET information on different BWPs, configuring DCI belonging to the target UE in the CORESET, allocating transmission resources to the target UE according to the DCI of the target UE, and using the above transmission resources to achieve information transmission with the target UE.

Figure 4A:
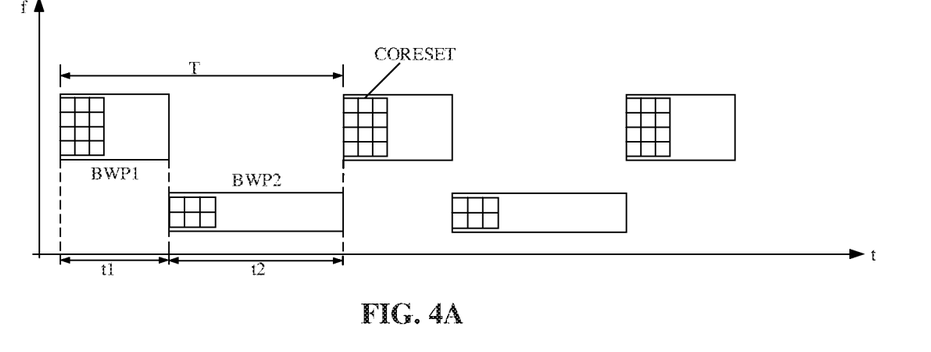
FIG. 4A is a schematic diagram illustrating a scenario for adjusting information transmission according to an exemplary embodiment.

FIG. 4A is a schematic diagram of an application scenario for adjusting information transmission according to an exemplary embodiment. It may be assumed that a time window with a cycle length T includes two sub-windows, respectively: a first time window with a duration t1, and a second time window with a duration t2. In the first time window, the base station may schedule the target UE on BWP1; and in the second time window, the base station may schedule the target UE on BWP2. Similarly, the base station may schedule the target UE periodically on different BWPs according to the above periodic scheduling mode, so as to satisfy the objective that the target UE can transmit different amounts of service data or different service data in different periods. In FIG. 4A, the frequency ranges of BWP1 and BWP2 are different.

In another embodiment of the present disclosure, in the information of periodic-scheduling configuration, the frequency ranges of BWPs corresponding to different time windows may also have overlapping portions, that is, the frequency range of one or more BWPs scheduled within the cycle length T is determined after being enlarged or shortened with reference to the frequency range of one of the BWPs within the period. In this case, the target UE can be informed of the part of the referenced BWP information of transmission configuration only, such as the time-frequency position of the CORESET, thereby reducing the data volume of the information of periodic-scheduling configuration and saving control signaling overheads.

Figure 4B:
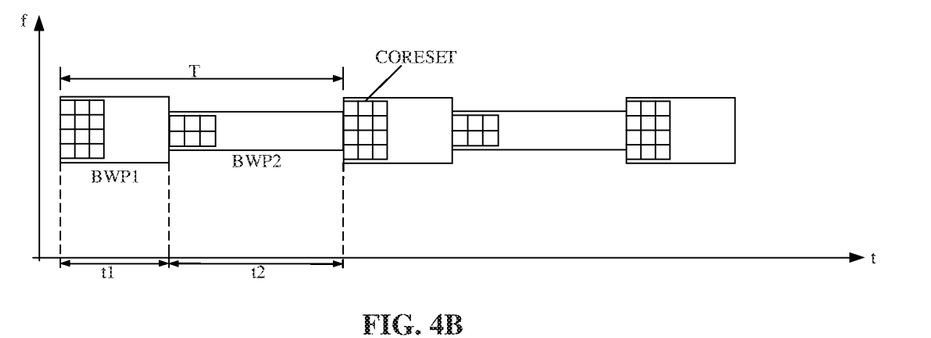
FIG. 4B is a schematic diagram illustrating a scenario for adjusting information transmission according to an exemplary embodiment.

Exemplarily, FIG. 4B is a schematic diagram of another application scenario for adjusting information transmission according to an exemplary embodiment. BWP2 may be determined after adjusting the frequency range based on BWP1. Part of BWP1 may transmit configuration information such as a time-frequency position of the CORESET, which may be used as prior information in BWP2. The base station does not need to instruct the target UE to make re-configuration, thereby saving signaling overheads.

In another embodiment of the present disclosure, in the process of the base station periodically scheduling the target UE through different BWPs, periodic scheduling for the target UE may also be cancelled.

Figure 5:
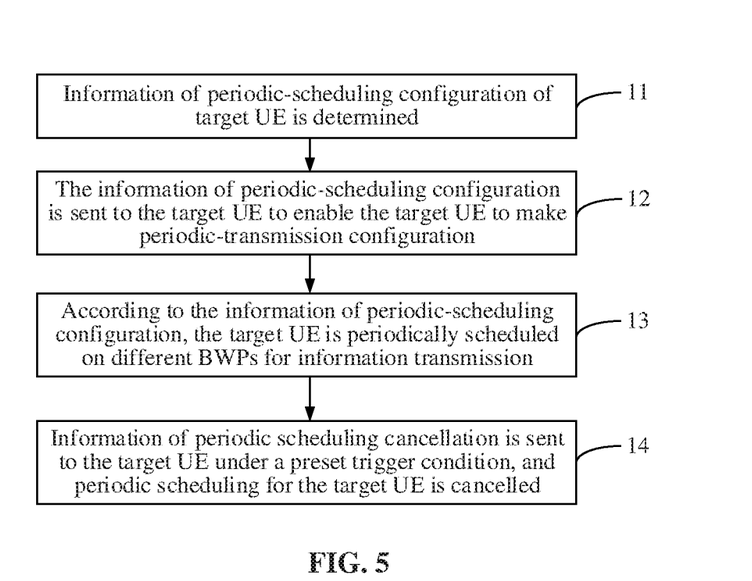
FIG. 5 is a flowchart illustrating a method for adjusting information transmission according to an exemplary embodiment.

FIG. 5 is a flowchart illustrating a method for adjusting information transmission according to an exemplary embodiment. On the basis of the embodiment shown in FIG. 1, after step 13, the method may include the following step.

In step 14, information of periodic scheduling cancellation is sent to the target UE under a preset trigger condition, and periodic scheduling for the target UE is cancelled.

The above preset trigger condition may be receiving of a periodic scheduling cancellation request from the target UE, or ending of timing of the preset periodic scheduling.

In another embodiment of the present disclosure, the information of periodic scheduling cancellation may include, in addition to cancellation indication information, information of transmission configuration of subsequently scheduled BWPs after the periodic scheduling is cancelled.

The above subsequent scheduling may be new periodic scheduling with different cycle lengths, or may be aperiodic scheduling.

In another embodiment of the present disclosure, if the above subsequent scheduling is aperiodic scheduling, the base station may also specify information of transmission configuration of one of the BWPs, such as BWP1 or BWP2 in FIG. 4A, in the current scheduling period, as the information of transmission configuration of the subsequently scheduled BWPs, or may instruct the target UE to restore the transmission configuration before the periodic scheduling is carried out, such as the transmission configuration of BWP0, so that the target UE can resume the transmission configuration according to the prior information of transmission configuration, thereby reducing the data volume of information of transmission configuration and the occupied transmission resources, and saving signaling overheads accordingly.

Regarding the timing of canceling the periodic scheduling, upon when a scheduling cancellation request is received, the current periodic scheduling may be stopped immediately, or may be cancelled after the current periodic scheduling is completed.

In the method for adjusting information transmission provided by the present disclosure, for UE with a transmission traffic periodically changed, such as an IoT device, the base station may determine and send information of periodic-scheduling configuration to the UE, and schedule BWPs of different bandwidths in a time period T according to the information of periodic-scheduling configuration for transmitting service data with a large change in the data volume of target UE in different periods, thereby reasonably utilizing wireless transmission resources. Meanwhile, since the target UE is enabled to configure information of transmission configuration of different BWPs in different time windows through one piece of information of periodic-scheduling configuration, the base station does not need to send deactivation/activation control information to the target UE for multiple times in one cycle length T to achieve period handover on multiple BWPs, thereby saving control signaling overheads, improving the efficiency of BWP handover, effectively shortening the transmission delay caused by BWP handover, enhancing the efficiency of information transmission, and improving user experience in use of a 5G NR network device.

Figure 6:
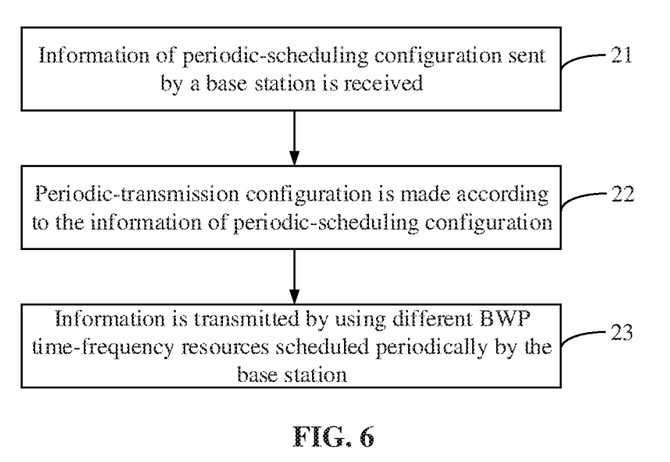
FIG. 6 is a flowchart illustrating a method for adjusting information transmission according to an exemplary embodiment.

Correspondingly, the present disclosure also provides a method for adjusting information transmission, applied to UE. FIG. 6 is a flowchart illustrating a method for adjusting information transmission according to an exemplary embodiment. The method may include the following steps.

In step 21, information of periodic-scheduling configuration sent by a base station is received, the information of periodic-scheduling configuration being configured to instruct the UE to transmit service data periodically through at least two BWPs. This step corresponds to step 12.

In step 22, periodic-transmission configuration is made according to the information of periodic-scheduling configuration.

In the embodiment, the target UE may make, according to the information of periodic-scheduling configuration, BWP transmission configuration corresponding to the first time window before the time duration T starts, and then make corresponding BWP transmission configuration in turn when each time window arrives.

As shown in FIG. 4A, the above transmission configuration process is as follows: when the cycle length T is about to start, the UE searches for its own DCI according to a CORESET time-frequency position of BWP1, uplink and downlink transmissions are performed respectively by using uplink and downlink transmission resources allocated by the base station according to scheduling control information included in the DCI, and after the first time window t1 ends, the transmission configuration of BWP2 is performed in the same manner, and so on. During the handover between BWP1 and BWP2, the base station does not need to re-send control signaling for deactivating BWP1 and activating BWP2, which saves signaling overheads.

In step 23, information is transmitted by using different BWP time-frequency resources scheduled periodically by the base station.

Figure 7:
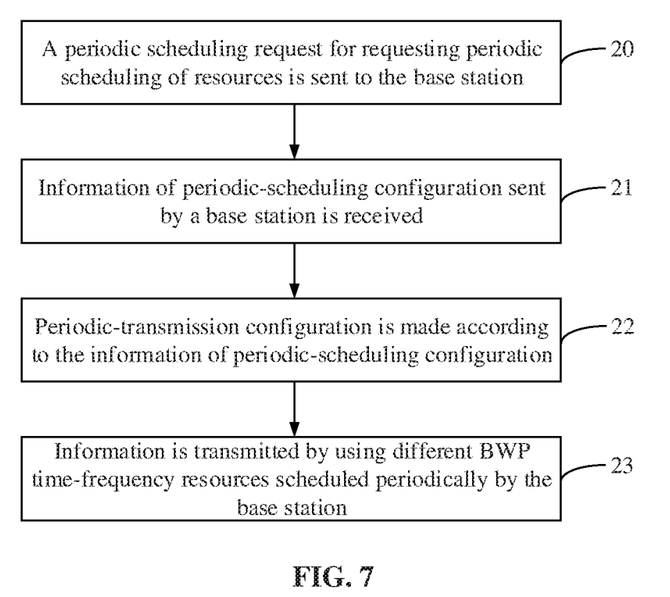
FIG. 7 is a flowchart illustrating a method for adjusting information transmission according to an exemplary embodiment.

FIG. 7 is a flowchart illustrating a method for adjusting information transmission according to an exemplary embodiment. On the basis of the embodiment shown in FIG. 6, before step 21, the method may include the following step.

In step 20, a periodic scheduling request for requesting periodic scheduling of resources is sent to the base station, the periodic scheduling request at least including: an identity of the UE and information of the periodic scheduling request.

The step 20 corresponds to the step 111 (FIG. 2) and is applicable to a case where the UE initiatively requests the base station to perform periodic scheduling. The information of the periodic scheduling request may be expressed in the above three forms, which will not be repeated here.

Figure 8:
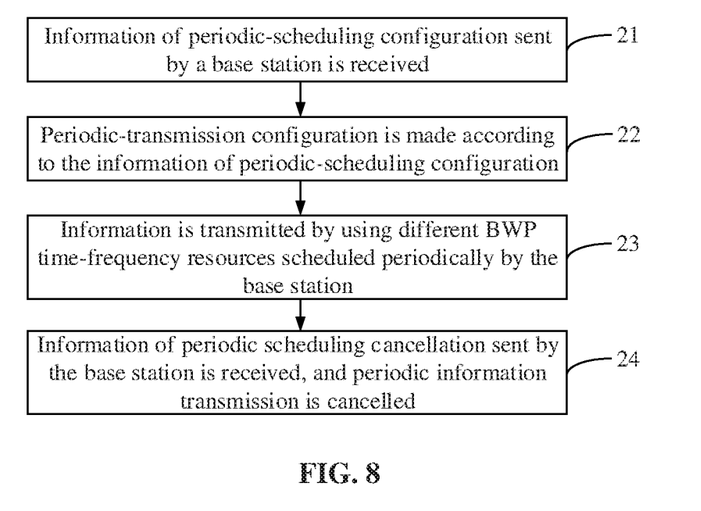
FIG. 8 is a flowchart illustrating a method for adjusting information transmission according to an exemplary embodiment.

FIG. 8 is a flowchart illustrating a method for adjusting information transmission according to an exemplary embodiment. On the basis of the embodiment shown in FIG. 6, the method may include the following step.

In step 24, information of periodic scheduling cancellation sent by the base station is received, and periodic information transmission is cancelled.

The step 24 corresponds to step 14 (FIG. 5). The target UE may immediately cancel the periodic transmission according to the information of periodic scheduling cancellation, or stop transmitting the service data periodically after completing the current scheduling period. The transmission configuration and the information transmission may be performed according to the information of subsequent BWP configuration instructed by the base station.

It can be seen that by adopting the method for adjusting information transmission provided by the present disclosure, the target UE may implement multiple handovers between different BWPs within a scheduling cycle length T according to the information of periodic-scheduling configuration issued by the base station once, which can effectively improve the BWP handover efficiency of the UE and save the overheads of signaling for indicating BWP handover, while avoiding waste of resources caused by the target UE using inappropriate bandwidth resources or avoiding excessively long delays in transmission of delay-sensitive services, and effectively improving user experience in use of the UE in 5G NR networks.

For simple description, each of the above method embodiments is expressed as a combination of a series of operations, but those skilled in the art will understand that the present disclosure is not limited to the described operation sequence and some steps can be executed in other sequences or at the same time according to the present disclosure. Those skilled in the art will also understand that all the embodiments described in the specification are exemplary, and involved operations and modules are not always necessary to the present disclosure.

Corresponding to the above method embodiments, the present disclosure also provides apparatus embodiments.

Figure 9:
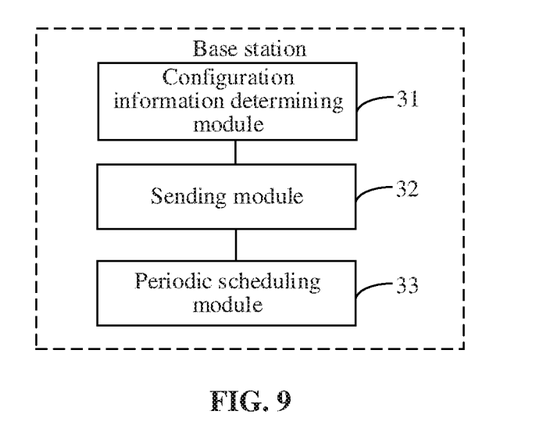
FIG. 9 is a block diagram illustrating a base station according to an exemplary embodiment.

FIG. 9 is a block diagram illustrating a base station according to an exemplary embodiment. The base station may include: a configuration information determining module 31, a sending module 32, and a periodic scheduling module 33.

The configuration information determining module 31 is configured to determine information of periodic-scheduling configuration of target UE, the information of periodic-scheduling configuration being configured to instruct the target UE to transmit service data periodically through at least two different BWPs.

The information of periodic-scheduling configuration may include: a preset cycle length, at least two time windows arranged in a preset order within the cycle length, and information of transmission configuration of a BWP corresponding to each of the at least two time windows. The information of transmission configuration of the BWP may include: a frequency range, and a time-frequency position of a CORESET.

In an embodiment of the present disclosure, the configuration information determining module 31 may be configured to query a preset configuration list according to the identity of the target UE, and acquire information of periodic-scheduling configuration corresponding to the identity of the target UE, the preset configuration list including: a correspondence between an identity of UE and information of periodic-scheduling configuration.

The sending module 32 is configured to send the information of periodic-scheduling configuration to the target UE to enable the target UE to make periodic-transmission configuration.

The periodic scheduling module 33 is configured to periodically schedule, according to the information of periodic-scheduling configuration, the target UE on different BWPs for information transmission.

Figure 10:
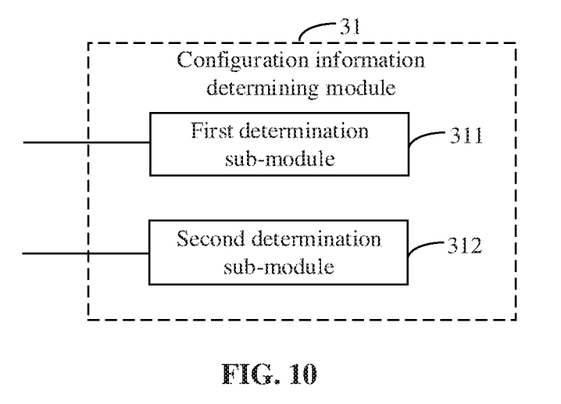
FIG. 10 is a block diagram illustrating a base station according to an exemplary embodiment.

FIG. 10 is a block diagram illustrating the configuration information determining module 31 of the base station according to an exemplary embodiment. On the basis of the embodiment of the base station shown in FIG. 9, the configuration information determining module 31 may include: a first determination sub-module 311 or a second determination sub-module 312.

The first determination sub-module 311 is configured to determine the information of periodic-scheduling configuration initiatively under a preset trigger condition.

The second determination sub-module 312 is configured to determine the information of periodic-scheduling configuration in response to a periodic scheduling request of the target UE.

Figure 11:
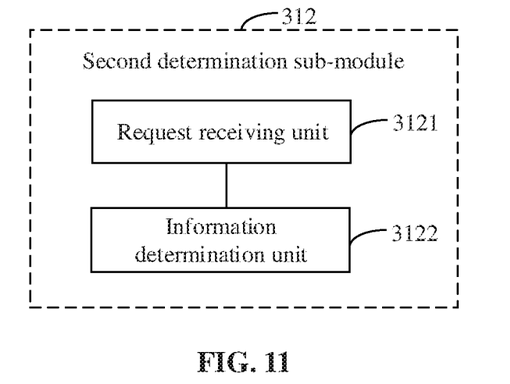
FIG. 11 is a block diagram illustrating a base station according to an exemplary embodiment.

FIG. 11 is a block diagram illustrating the second determination sub-module 312 of the base station, according to an exemplary embodiment. On the basis of the embodiment of the base station shown in FIG. 10, the second determination sub-module 312 may include: a request receiving unit 3121 and an information determination unit 3122.

The request receiving unit 3121 is configured to receive a periodic scheduling request sent by the target UE for requesting periodic scheduling of resources, the periodic scheduling request at least including: an identity of the target UE and information of the periodic scheduling request.

In an embodiment of the present disclosure, the information of the periodic scheduling request received by the request receiving unit 3121 may include: a cycle length, the number of and an arrangement order of time windows within the cycle length, and a time-frequency range of a BWP corresponding to each of the time windows.

In another embodiment of the present disclosure, the information of the periodic scheduling request received by the request receiving unit 3121 may include: window numbers of preset time-frequency resource windows and ranking information of the window numbers.

The information determination unit 3122 is configured to determine the information of periodic-scheduling configuration of the target UE according to a scheduling adjustment request.

Correspondingly, in an embodiment of the present disclosure, the information determination unit 3122 may be configured to generate the information of periodic-scheduling configuration according to the information of the periodic scheduling request.

Figure 12:
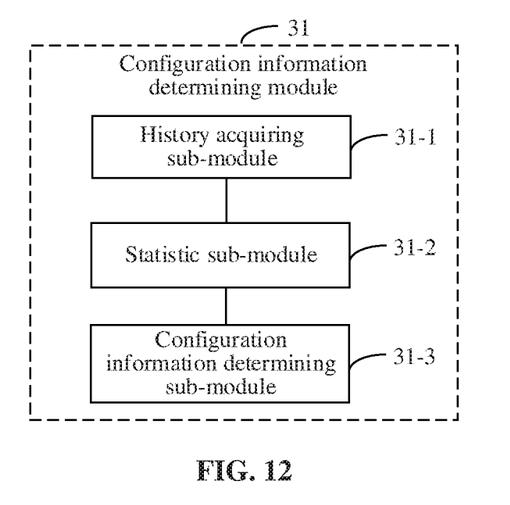
FIG. 12 is a block diagram illustrating a base station according to an exemplary embodiment.

FIG. 12 is a block diagram illustrating the configuration information determining module 31 of the base station according to an exemplary embodiment. On the basis of the embodiment of the base station shown in FIG. 9, the configuration information determining module 31 may include: a history acquiring sub-module 31-1, a statistic sub-module 31-2, and a configuration information determining sub-module 31-3.

The history acquiring sub-module 31-1 is configured to acquire a service transmission record of the target UE within a preset historical duration.

The statistic sub-module 31-2 is configured to calculate, according to the service transmission record, a transmission ratio of different types of services within a period.

The configuration information determining sub-module 31-3 is configured to determine the information of periodic-scheduling configuration according to the transmission ratio.

Figure 13:
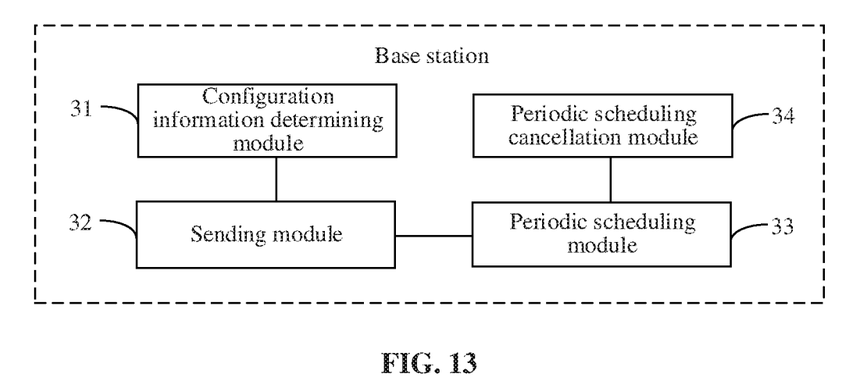
FIG. 13 is a block diagram illustrating a base station according to an exemplary embodiment.

FIG. 13 is a block diagram illustrating a base station according to an exemplary embodiment. On the basis of the embodiment of the base station shown in FIG. 9, the base station may further include: a periodic scheduling cancellation module 34.

The periodic scheduling cancellation module 34 is configured to send information of periodic scheduling cancellation to the target UE under a preset trigger condition, and cancel periodic scheduling for the target UE.

In an embodiment of the present disclosure, the information of periodic scheduling cancellation may include: information of transmission configuration of subsequently scheduled BWPs.

In another embodiment of the present disclosure, the information of transmission configuration of the subsequently scheduled BWPs may include: information of transmission configuration of the BWP contained in the information of periodic-scheduling configuration.

Figure 14:
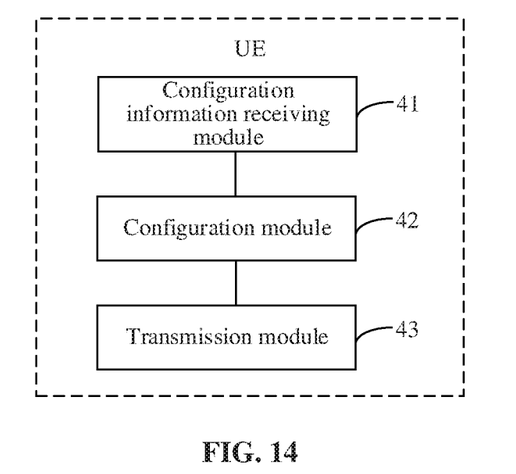
FIG. 14 is a block diagram illustrating UE according to an exemplary embodiment.

Correspondingly, the present disclosure also provides UE. FIG. 14 is a block diagram illustrating UE according to an exemplary embodiment. The UE may include: a configuration information receiving module 41, a configuration module 42, and a transmission module 43.

The configuration information receiving module 41 is configured to receive information of periodic-scheduling configuration sent by a base station, the information of periodic-scheduling configuration being used for instructing the UE to transmit different service data periodically through at least two BWPs.

The configuration module 42 is configured to make periodic-transmission configuration according to the information of periodic-scheduling configuration.

The transmission module 43 is configured to transmit information by using different BWP time-frequency resources scheduled periodically by the base station.

Figure 15:
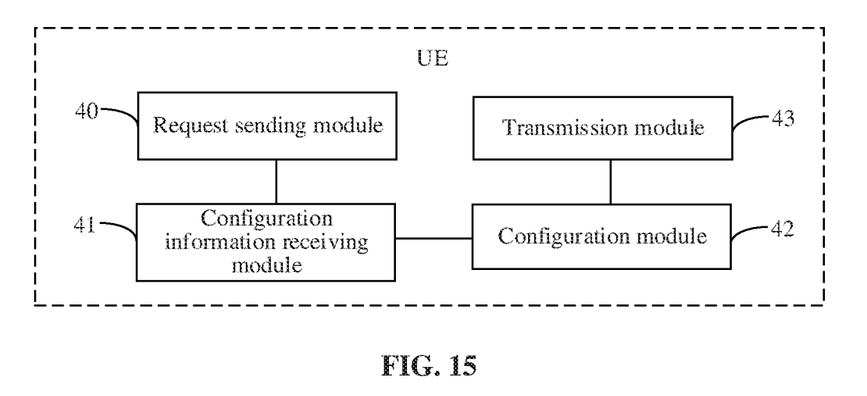
FIG. 15 is a block diagram illustrating UE according to an exemplary embodiment.

FIG. 15 is a block diagram illustrating UE according to an exemplary embodiment. On the basis of the embodiment of the UE shown in FIG. 14, the UE may further include: a request sending module 40.

The request sending module 40 is configured to send a periodic scheduling request for requesting periodic scheduling of resources to the base station, the periodic scheduling request at least including: an identity of the UE and information of the periodic scheduling request.

In an embodiment of the present disclosure, the information of the periodic scheduling request sent by the request sending module 40 may include: a cycle length, the number of and an arrangement order of time windows within the cycle length, and a time-frequency range of a BWP corresponding to each time window.

In another embodiment of the present disclosure, the information of the periodic scheduling request sent by the request sending module 40 may include: window numbers of preset BWP time-frequency resource windows and ranking information of the window numbers.

Figure 16:
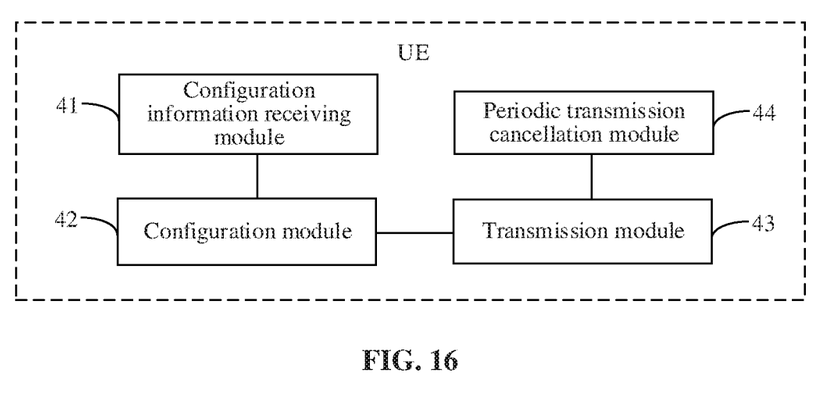
FIG. 16 is a block diagram illustrating UE according to an exemplary embodiment.

FIG. 16 is a block diagram illustrating UE according to an exemplary embodiment. On the basis of the embodiment of the UE shown in FIG. 14, the UE may further include: a periodic transmission cancellation module 44.

The periodic transmission cancellation module 44 is configured to receive information of periodic scheduling cancellation sent by the base station, and cancel periodic information transmission.

The apparatus embodiments substantially correspond to the method embodiments, and reference may be made to of descriptions of the method embodiments for operations of the modules and units. The modules and units described as separate parts may or may be not physically separated, and may be located in the same place or may be distributed to multiple networks. Part or all of the modules or units may be selected according to a practical requirement to achieve the solutions of the present disclosure.

Embodiments of the present disclosure also provide a base station, which includes: a processor; and a memory configured to store an executable instruction of the processor, wherein the processor is configured to: determine information of periodic-scheduling configuration of target UE, the information of periodic-scheduling configuration being configured to instruct the target UE to transmit service data periodically through at least two different BWPs; send the information of periodic-scheduling configuration to the target UE to enable the target UE to make periodic-transmission configuration; and periodically schedule, according to the information of periodic-scheduling configuration, the target UE on different BWPs for information transmission.

Embodiments of the present disclosure also provide UE, which includes: a processor; and a memory configured to store an executable instruction of the processor, wherein the processor is configured to: receive information of periodic-scheduling configuration sent by a base station, the information of periodic-scheduling configuration being configured to instruct the UE to transmit different service data periodically through at least two BWPs; make periodic-transmission configuration according to the information of periodic-scheduling configuration; and transmit information by using different BWP time-frequency resources scheduled periodically by the base station.

Figure 17:
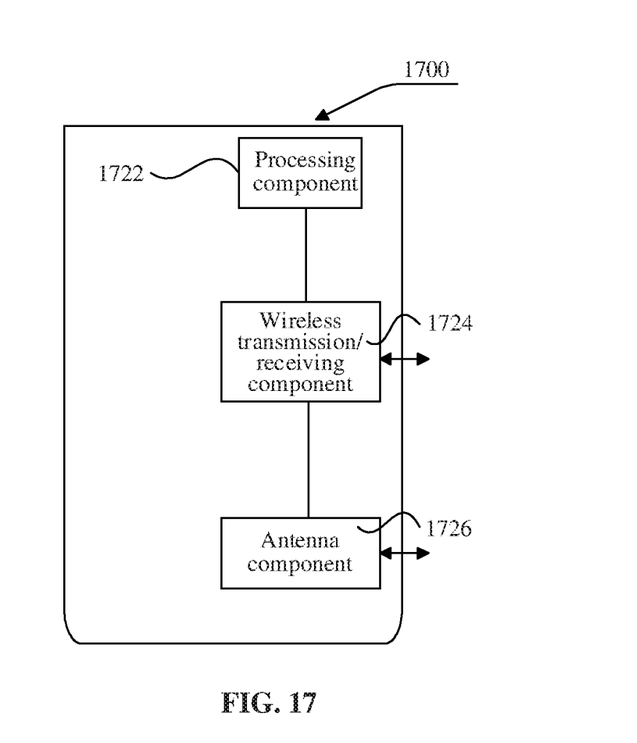
FIG. 17 is a schematic diagram illustrating a base station according to an exemplary embodiment.

FIG. 17 is a schematic diagram of a base station 1700 according to an exemplary embodiment. The base station may be applied to a 5G NR network. Referring to FIG. 17, the base station 1700 includes a processing component 1722, a wireless transmission/receiving component 1724, an antenna component 1726 and a wireless interface-specific signal processing part, and the processing component 1722 may further include one or more processors.

One processor in the processing component 1722 may be configured to: determine information of periodic-scheduling configuration of target UE, the information of periodic-scheduling configuration being configured to instruct the target UE to transmit service data periodically through at least two different BWPs; send the information of periodic-scheduling configuration to the target UE to enable the target UE to make periodic-transmission configuration and periodically schedule, according to the information of periodic-scheduling configuration, the target UE on different BWPs for information transmission.

In an exemplary embodiment, there is also provided a non-transitory computer readable storage medium having computer instructions stored thereon. The computer instructions may be executed by the processing component 1722 of the base station 1700 to complete the above described methods for adjusting information transmission. For example, the non-transitory computer-readable storage medium may be a ROM, a random access memory (RAM), a CD-ROM, a magnetic tape, a floppy disc, an optical data storage device and the like.

Figure 18:
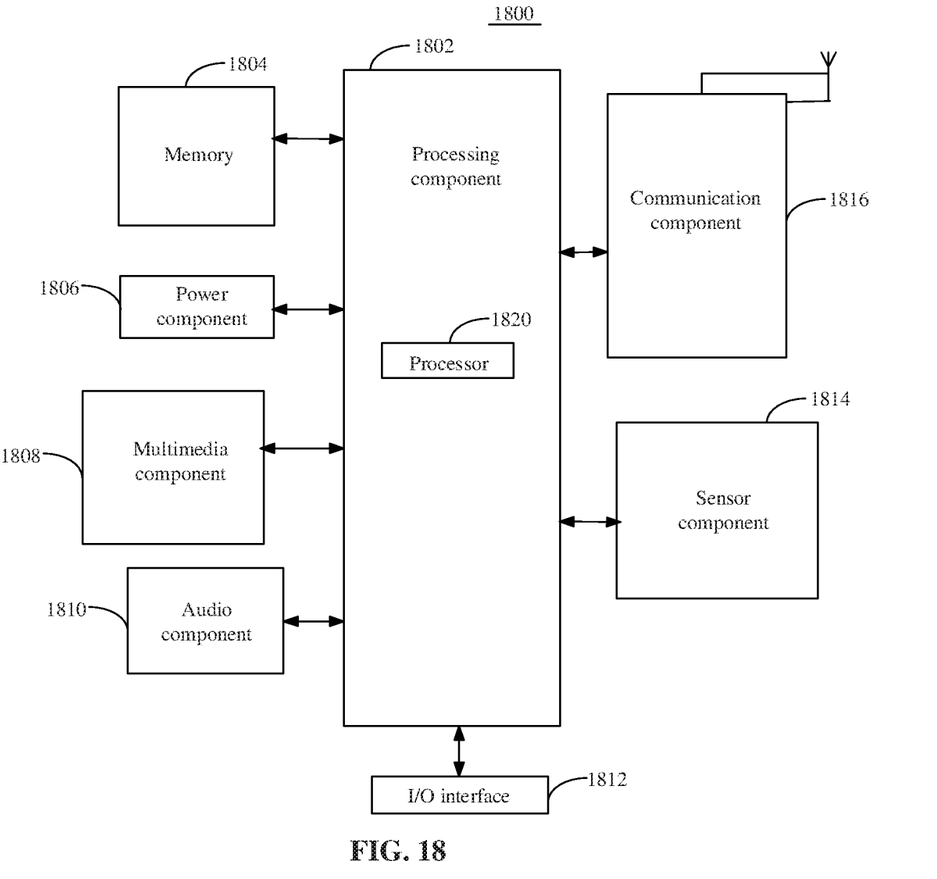
FIG. 18 is a schematic diagram illustrating UE according to an exemplary embodiment.

FIG. 18 is a schematic diagram illustrating UE 1800 according to an exemplary embodiment. For example, the UE 1800 may be a terminal in a 5G NR network, and may specifically be a mobile phone, a computer, a digital broadcast terminal, a messaging device, a gaming console, a tablet, a medical device, exercise equipment, a personal digital assistant, or a wearable device such as a smart watch, smart glasses, a smart bracelet and smart running shoes.

Referring to FIG. 18, the UE 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 is typically configured to control overall operations of the UE 1800, such as the operations associated with display, telephone calls, data communications, camera operations, and recording operations. The processing component 1802 may include one or more processors 1820 to execute instructions to perform all or part of the steps in the above described methods. Moreover, the processing component 1802 may include one or more modules which facilitate the interaction between the processing component 1802 and other components. For example, the processing component 1802 may include a multimedia module to facilitate the interaction between the multimedia component 1808 and the processing component 1802.

The memory 1804 is configured to store various types of data to support the operation of the UE 1800. Examples of such data include instructions for any applications or methods operated on the UE 1800, contact data, phonebook data, messages, pictures, video, etc. The memory 1804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 may provide power to various components of the UE 1800. The power component 1806 may include a power management system, one or more power sources, and any other components associated with the generation, management, and distribution of power in the UE 1800.

The multimedia component 1808 may include a screen for providing an output interface between the UE 1800 and the user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1808 may include a front camera and/or a rear camera. The front camera and/or the rear camera may receive external multimedia data when the device 1800 is in an operation mode, such as a photographing mode or a video mode. Each of the front camera and the rear camera may be a fixed optical lens system or have focusing and optical zooming capabilities.

The audio component 1810 is configured to output and/or input audio signals. For example, the audio component 1810 includes a microphone (MIC) configured to receive an external audio signal when the UE 1800 is in an operation mode, such as a call mode, a recording mode, and a voice recognition mode. The received audio signal may be further stored in the memory 1804 or transmitted via the communication component 1816. In some embodiments, the audio component 1810 further includes a speaker to output audio signals.

The I/O interface 1812 is configured to provide an interface between the processing component 1802 and peripheral interface modules, such as a keyboard, a click wheel, buttons, and the like. The buttons may include, but are not limited to, a home button, a volume button, a starting button, and a locking button.

The sensor component 1814 may include one or more sensors to provide status assessments of various aspects of the UE 1800. For instance, the sensor component 1814 may detect an on/off status of the device 1800 and relative positioning of components, such as a display and small keyboard of the device 1800, and the sensor component 1814 may further detect a change in a position of the device 1800 or a component of the device 1800, presence or absence of contact between the user and the device 1800, orientation or acceleration/deceleration of the device 1800 and a change in temperature of the device 1800. The sensor component 1814 may include a proximity sensor configured to detect presence of an object nearby without any physical contact. The sensor component 1814 may also include a light sensor, such as a complementary metal oxide semiconductor (CMOS) or charge coupled device (CCD) image sensor, configured for use in an imaging application. In some embodiments, the sensor component 1814 may also include an acceleration sensor, a gyroscope sensor, a magnetic sensor, a pressure sensor or a temperature sensor.

The communication component 1816 is configured to facilitate communication, wired or wirelessly, between the UE 1800 and other devices. The UE 1800 can access a wireless network based on a communication standard, such as WiFi, 4G, or 5G, or a combination thereof. In one exemplary embodiment, the communication component 1816 receives a broadcast signal or broadcast associated information from an external broadcast management system via a broadcast channel. In one exemplary embodiment, the communication component 1816 further includes a near field communication (NFC) module to facilitate short-range communications. In one exemplary embodiment, the communication component 1816 may be implemented based on a radio frequency identification (RFID) technology, an infrared data association (IrDA) technology, an ultra-wideband (UWB) technology, a Bluetooth (BT) technology, and other technologies.

In exemplary embodiments, the UE 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1804, executable by the processor 1820 in the UE 1800, for performing the above described methods for adjusting information transmission. For example, the non-transitory computer-readable storage medium may be a ROM, a RAM, a CD-ROM, a magnetic tape, a floppy disc, an optical data storage device and the like.

The technical solutions provided by the embodiments of the present disclosure may include the following beneficial effects:

According to the method for adjusting information transmission provided by the present disclosure, for UE with a transmission traffic periodically changed, such as an IoT device, a base station may determine and send information of periodic-scheduling configuration to the UE, and schedule BWPs of different bandwidths in a time period T according to the information of periodic-scheduling configuration for transmitting service data with a large change in the data volume of target UE in different periods, thereby reasonably utilizing wireless transmission resources. Meanwhile, since the target UE is enabled to configure information of transmission configuration for different BWPs in different time windows through one piece of information of periodic-scheduling configuration, the base station does not need to send deactivation/activation control information to the target UE for multiple times in one cycle length T to achieve period handover on multiple BWPs, thereby saving overheads of control signaling, improving the efficiency of BWP handover, effectively shortening the transmission delay caused by BWP handover, enhancing the efficiency of information transmission, and improving user experience in use of a 5G NR network device.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for adjusting information transmission, implemented by a base station, the method comprising:

determining information of periodic-scheduling configuration of target user equipment (UE), the information of periodic-scheduling configuration being configured to instruct the target UE to transmit service data with different data volumes periodically through at least two different band width parts (BWPs) that have different bandwidths;

sending the information of periodic-scheduling configuration to the target UE to enable the target UE to make periodic-transmission configuration, without sending deactivation or activation control information about BWP deactivation or activation within a preset cycle length indicated in the information of periodic-scheduling configuration to the target UE; and periodically scheduling, according to the information of periodic-scheduling configuration, the target UE on different BWPs for information transmission, wherein the determining the information of periodic-scheduling configuration of the target UE comprises, under a preset trigger condition or in response to a periodic scheduling request of the target UE:

acquiring a service transmission record of the target UE within a preset historical duration;

calculating, according to the service transmission record, a transmission ratio of different types of services within a period; and determining the information of periodic-scheduling configuration according to the transmission ratio.

2. The method according to claim 1, wherein the information of periodic-scheduling configuration comprises:

the preset cycle length, at least two time windows arranged in a preset order within the preset cycle length, and information of transmission configuration of a BWP corresponding to each of the at least two time windows;

wherein the information of transmission configuration of the BWP comprises: a frequency range, and a time-frequency position of a control resource set (CORESET).

3. The method according to claim 1, wherein the determining the information of periodic-scheduling configuration in response to the periodic scheduling request of the target UE further comprises:

receiving the periodic scheduling request from the target UE for requesting periodic scheduling of resources, the periodic scheduling request at least comprising an identity of the target UE and information of the periodic scheduling request; and determining the information of periodic-scheduling configuration of the target UE according to the periodic scheduling request.

4. The method according to claim 3, wherein the information of the periodic scheduling request comprises: a cycle length, a number of and an arrangement order of time windows within the cycle length, and a time-frequency range of a BWP corresponding to each of the time windows.

5. The method according to claim 4, wherein the determining the information of periodic-scheduling configuration of the target UE according to the periodic scheduling request comprises:

generating the information of periodic-scheduling configuration according to the information of the periodic scheduling request.

6. The method according to claim 3, wherein the information of the periodic scheduling request comprises: a preset time-frequency resource window number, and ranking information of window numbers.

7. The method according to claim 6, wherein the determining the information of periodic-scheduling configuration of the target UE according to the periodic scheduling request comprises:

generating the information of periodic-scheduling configuration according to the information of the periodic scheduling request.

8. The method according to claim 1, wherein the determining the information of periodic-scheduling configuration further comprises:

querying a preset configuration list according to an identity of the target UE, and acquiring information of periodic-scheduling configuration corresponding to the identity of the target UE, wherein the preset configuration list comprises: a correspondence between an identity of UE and information of periodic-scheduling configuration.

9. The method according to claim 1, further comprising:

sending information of periodic scheduling cancellation to the target UE under a preset trigger condition, and canceling periodic scheduling for the target UE.

10. The method according to claim 9, wherein the information of periodic scheduling cancellation comprises: information of transmission configuration of subsequently scheduled BWPs.

11. The method according to claim 10, wherein the information of transmission configuration of the subsequently scheduled BWPs comprises: information of transmission configuration of the BWPs contained in the information of periodic-scheduling configuration.

12. A base station, comprising:

a processor; and a memory configured to store an executable instruction of the processor, wherein the processor is configured to:

determine information of periodic-scheduling configuration of target user equipment (UE), the information of periodic-scheduling configuration being configured to instruct the target UE to transmit service data with different data volumes periodically through at least two different band width parts (BWPs) that have different bandwidths;

send the information of periodic-scheduling configuration to the target UE to enable the target UE to make periodic-transmission configuration, without sending deactivation or activation control information about BWP deactivation or activation within a preset cycle length indicated in the information of periodic-scheduling configuration to the target UE; and periodically schedule, according to the information of periodic-scheduling configuration, the target UE on different BWPs for information transmission, wherein in determining the information of periodic-scheduling configuration of the target UE, the processor is further configured to, under a preset trigger condition or in response to a periodic scheduling request of the target UE:

acquire a service transmission record of the target UE within a preset historical duration;

calculate, according to the service transmission record, a transmission ratio of different types of services within a period; and determine the information of periodic-scheduling configuration according to the transmission ratio.

* * * * *